(12) United States Patent
Gottwald et al.

(10) Patent No.: US 8,123,420 B2
(45) Date of Patent: Feb. 28, 2012

(54) LENS STACK, MOUNTED IN A GAS-TIGHT MANNER, FOR A CAMERA HOUSING

(75) Inventors: Frank Gottwald, Weissach (DE); Uwe Apel, Neckartailfingen (DE)

(73) Assignee: Robert Bosch GmbH, Stuttgart (DE)

( * ) Notice: Subject to any disclaimer, the term of this patent is extended or adjusted under 35 U.S.C. 154(b) by 806 days.

(21) Appl. No.: 11/665,146

(22) PCT Filed: Aug. 26, 2005

(86) PCT No.: PCT/EP2005/054215
§ 371 (c)(1),
(2), (4) Date: Oct. 14, 2008

(87) PCT Pub. No.: WO2006/040216
PCT Pub. Date: Apr. 20, 2006

(65) Prior Publication Data
US 2011/0097072 A1    Apr. 28, 2011

(30) Foreign Application Priority Data
Oct. 13, 2004  (DE) .......................... 10 2004 049 871

(51) Int. Cl.
*G03B 17/00* (2006.01)
(52) U.S. Cl. ...................................................... 396/529
(58) Field of Classification Search .................... 396/529
See application file for complete search history.

(56) References Cited

U.S. PATENT DOCUMENTS

| 3,582,188 | A | * | 6/1971 | Rau et al. ....................... 359/676 |
| 4,030,109 | A | * | 6/1977 | Hecker et al. .................... 396/11 |
| 4,740,057 | A | | 4/1988 | Dezso et al. |
| 5,274,456 | A | | 12/1993 | Izumi et al. |
| 5,548,450 | A | | 8/1996 | Kang |
| 5,895,129 | A | * | 4/1999 | Ohta ............................... 396/79 |
| 6,462,330 | B1 | * | 10/2002 | Venkat et al. ................. 250/239 |
| 6,507,700 | B1 | | 1/2003 | Takekuma et al. |
| 6,898,030 | B1 | * | 5/2005 | Lin et al. ....................... 359/819 |

(Continued)

FOREIGN PATENT DOCUMENTS

CN    2539973    3/2003

(Continued)

OTHER PUBLICATIONS

Patent Abstracts of Japan, vol. 017, No. 273, May 26, 1993 & JP 05 011157 (Olympus Optical Co. Ltd.), Jan. 19, 1993.

*Primary Examiner* — Rodney Fuller
(74) *Attorney, Agent, or Firm* — Kenyon & Kenyon LLP

(57) ABSTRACT

A method for producing an objective lens mount for an objective lens of a camera suitable for use in motor vehicles includes the following method steps: The objective lens mount and a front housing half-shell of the camera are produced as one component in a single working process. The objective lens mount and the front housing shell are made of metal materials or plastic material having glass fiber components. The objective lens mount built in one piece with the front housing shell is adapted to the length of the objective lens by chip-forming machining.

13 Claims, 1 Drawing Sheet

U.S. PATENT DOCUMENTS

| | | | |
|---|---|---|---|
| 7,088,530 B1 * | 8/2006 | Recco et al. | 359/811 |
| 7,311,453 B2 * | 12/2007 | Li | 396/529 |
| 7,494,292 B2 * | 2/2009 | Kong et al. | 396/529 |
| 7,609,322 B2 * | 10/2009 | Takada | 348/374 |
| 7,755,857 B2 * | 7/2010 | Yu | 359/819 |
| 2003/0137595 A1 | 7/2003 | Takachi | |
| 2003/0193605 A1* | 10/2003 | Yamaguchi | 348/335 |
| 2004/0048507 A1 | 3/2004 | Hage | |
| 2004/0105025 A1 | 6/2004 | Scherling | |
| 2004/0183936 A1 | 9/2004 | Kim et al. | |
| 2006/0198944 A1* | 9/2006 | Gevelber et al. | 427/8 |

FOREIGN PATENT DOCUMENTS

| | | |
|---|---|---|
| CN | 1532571 | 9/2004 |
| EP | 0524603 | 1/1993 |
| EP | 1357780 | 10/2003 |
| JP | 2001 352469 | 12/2001 |
| JP | 2002 090603 | 3/2002 |
| JP | 05 011157 | 1/2005 |
| WO | WO 03/105465 | 12/2003 |

* cited by examiner

LENS STACK, MOUNTED IN A GAS-TIGHT MANNER, FOR A CAMERA HOUSING

BACKGROUND OF THE INVENTION

1. Field of the Invention

The present invention relates to a camera module for use in motor vehicles.

2. Description of Related Art

Camera modules used in motor vehicle operation are not only subject to high mechanical stresses, but to considerable temperature fluctuations as well, and to the effects of moisture. When a camera module is used that does not have a completely impervious design, under the climatic conditions typical of automotive applications, this can lead to dew formation in the optical path on the one hand, and to degradation of the image quality on the other hand. Moisture condensation is often observed when high relative air humidity has set in in the interior of the camera module for a length of time at elevated temperatures, and the camera module is then cooled within a very short period of time.

Optical recording units constructed from an objective lens and a sensor chip are typically designed to be hermetically sealed. The ingress of moisture resulting from vapor permeability that may be excessive for many of the materials used can be controlled by using absorbing agents, such as zeolite, for example. Besides gluing the front lens element of a lens stack in place, it is conceivable to use sealing rings, thus, for example, O-ring seals of various materials. This is a practical approach for achieving an impervious design. Compared to fixing in place by gluing, sealing rings made of elastomer material, for example, advantageously make a post-processing possible. Moreover, when sealing rings are used, there is no risk of contamination.

To reliably ensure the sealing action when a sealing ring is used, a defined compression of the sealing ring is produced by the engagement of the threaded connection. However, because manufacturing variances are inherent in the structural heights within a lens stack, which may include a plurality of lenses, a constant compression is not ensured for all pieces when a sealing ring is clamped between the frontmost lens surface and a contact mass, such as a ring-shaped area in the tubular housing of the objective lens. Moreover, it must be ensured that the sealing ring is not unevenly clamped, which can result, for example, from localized overstraining when the parts are screwed in place during assembly. To ensure the requisite image quality for objective lenses in the application cases mentioned at the outset, it is important to have as few deviations as possible in the positioning of the individual lenses. Thus, the individual lenses of a lens stack require appropriate guidance; the guidance of the individual lenses must not be adversely affected by skewed sealing rings. When a seal is resting on a front surface, any encroachment on the available beam diameter is disadvantageous, since the edge thickness of the front lens cannot be arbitrarily reduced.

A waterproof camera is described in published Japanese Patent Application No. JP 2002 090603. The waterproof camera is equipped with a camera housing which has a front part and a rear part. A lens stack is accommodated inside of the camera housing. Within the lens stack, a hollow space is formed behind the front lens. A lens allowing wide angle shots is situated inside the hollow space. The front lens of the lens stack is provided at the opening of the lens stack and, in addition, is used as seal. A projection at the edge of the lens stack is caulked onto the lens side in a thermal joining process. An O-ring seal is provided between the outer periphery of the lens and the peripheral surface of an inner wall for the lens stack to seal off the annular gap therebetween. In addition, another O-ring seal is provided between the outer peripheral surface of the edge part of the lens stack and the inner peripheral surface of the edge part of the front camera housing, in order to seal the clearance space therebetween.

Published Japanese patent application JP 2001 352469 describes an optical device in which the components required for its assembly are reduced in number. A front lens is used as front cover of a camera housing. The front lens is inserted into a recess of the housing, whose edges are formed in such a way that the optical recording area is not restricted. The design of the camera housing fixes the front lens and a rear lens in their position. Due to the design of the camera housing of the camera according to JP 2001 352469, it is impossible to achieve a compact design of the camera.

BRIEF SUMMARY OF THE INVENTION

According to the present invention, a compact and impervious design of a camera suitable for use in motor vehicles is provided, which is minimized with regard to the number of mechanical components and the mechanical interfaces and in which, during the assembly, the image sensor is positioned relative to the objective lens with the aid of a mechanical adjusting device. The mechanical adjusting advice may be a hexapod, for instance, which is able to be guided very precisely within six degrees of freedom.

The objective lens, which is formed by a lens stack having a plurality of lenses, is rigidly joined to the camera housing, such as a first housing half-shell of the camera housing. This also defines the position of the lens with respect to affixation devices with whose aid the camera suitable for use in motor vehicles will later be mounted in the vehicle and aligned. The image sensor assigned to the camera is actively operated during its assembly, and the image formation of the test image recorded via the objective lens is automatically analyzed during the assembly with regard to the sharp definition in different image sections and for different positioning. While the camera is assembled, the image sensor assigned to the camera is varied in its position relative to the lens stack in order to determine the optimal assembly position. As a result, corrections with regard to the positioning of the image sensor are still possible during the assembly process of the camera.

According to the present invention, an objective lens housing for accommodating a lens stack that encompasses a plurality of lenses, and a front housing shell of the camera which is suitable for use in motor vehicles, are able to be produced as one workpiece. It may be obtained from metal materials such as diecast aluminum, and thixomold, for example, or by way of deep-drawing. When using metal materials to produce the front housing shell of a camera suitable for use in motor vehicles, the imperviousness of the housing shell is ensured. Instead of the aforementioned metal materials, the front housing shell of the camera suitable for use in motor vehicles may also be made of plastic reinforced by glass fiber. The imperviousness of this material with regard to water vapor is produced via a metal film applied with the aid of plasma-coating technology.

The mount for the lens stack, i.e., the tubular section of the objective lens housing, may be produced via chip-forming machining methods, for instance by post-lathing an aluminum diecast component. In the process, a precise alignment of the tubular section of the objective lens housing with respect to the affixation devices disposed on the outside of the housing shell is able to be achieved. The fitting of the objective lens, i.e., the installation of the lens stack including a plurality of lenses, into the front housing shell as well as its testing may carried out at a vendor's facility, as the case may be. The fitting of the objective lens mount formed in the front housing shell may be implemented both via the outer side and via the inside, and also from both directions. If the fitting of the objective lens mount of the front housing shell takes place at the rear side and the lens stack is screwed in with the aid of a screw-in element, a sealing ring may be installed, which seals a lens pointing in the direction of the exterior of the housing from the interior of the objective lens mount integrally formed on the front housing shell, and in this way provides sealing with respect to the inside of the front housing shell.

The design approach provided according to the present invention makes it possible to dispense with a lens mount for accommodating the lens stack that would otherwise have to be separately installed in the housing of a camera suitable for use in motor vehicles. This also shortens the tolerance chain with regard to manufacture-related imprecisions, and it reduces the number of components. In addition, uncomplicated sealing of the camera housing is achievable. Furthermore, the design approach provided according to the present invention has the advantage of adapting the length of the objective lens mount, i.e., the tubular section, to the different applications during the post-machining, such as the post-lathing, which aids the component sharing principle. For instance, the front housing half-shell with integrated objective lens mount is able to be produced as aluminum diecast component, for example, which may be adapted to the particular application purpose via the chip-forming machining methods.

DETAILED DESCRIPTION OF THE INVENTION

Figure 1:
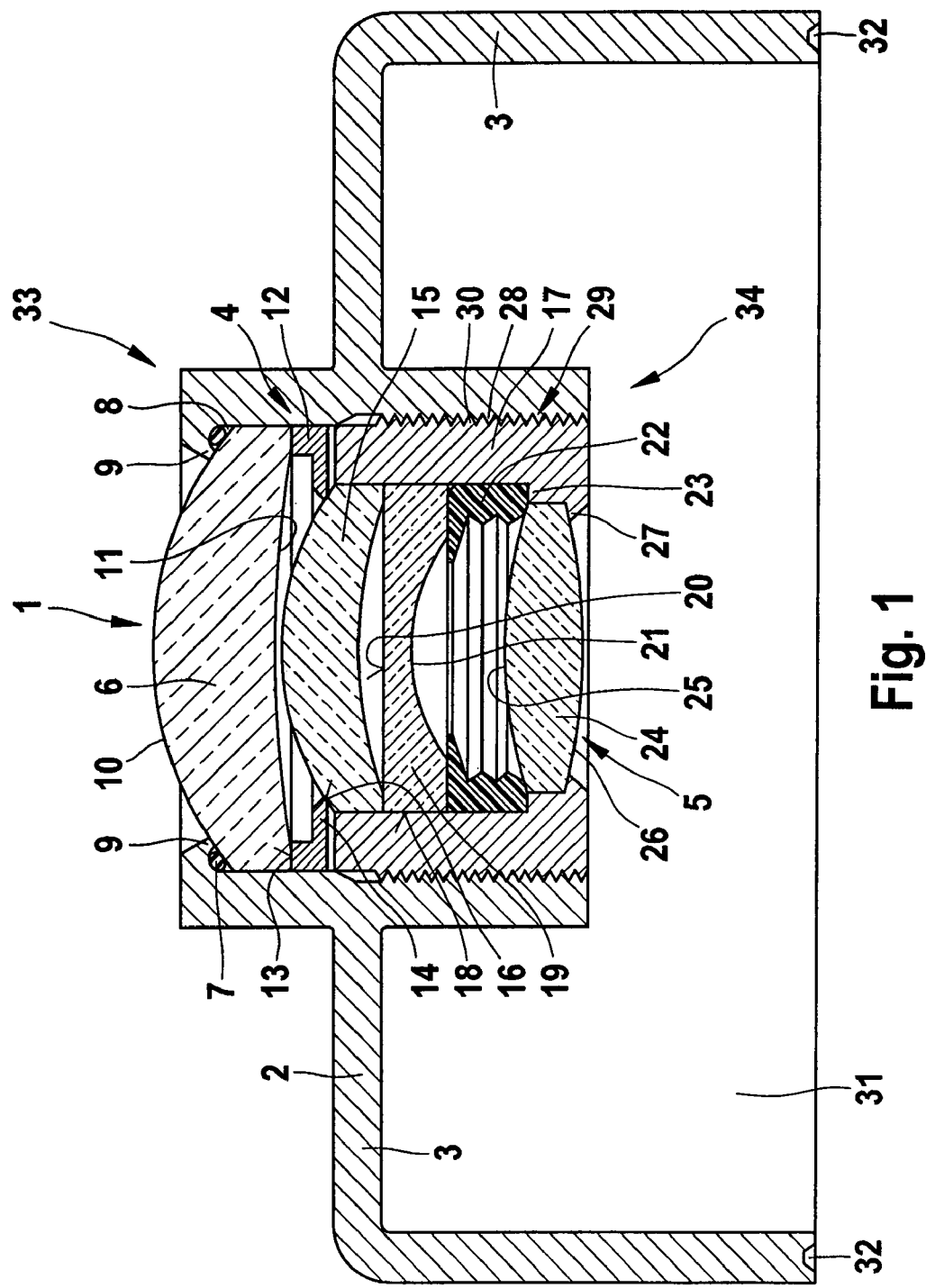
FIG. 1 shows a section through a housing half-shell of a camera suitable for use in motor vehicles, the camera having an integrated objective lens mount and a lens stack situated therein.

A front housing shell 3 of a camera suitable for use in motor vehicles is shown in the illustration according to FIG. 1. Front housing shell 3 of a housing 2 includes an objective lens mount 4 to accommodate a lens stack 5 that encompasses a plurality of lenses. Lens stack 5 forms an objective lens 1 of the camera suitable for use in motor vehicles.

Lens stack 5 includes an outer lens 6, which is sealed from front housing shell 3 with the aid of a sealing ring 7. To this end, front housing shell 3 has a recess 8 for sealing ring 7. Recess 8 for sealing ring 7 is formed in front housing shell 3 in such a way that gripping edges 9 grasp sealing ring 7, gripping edges 9 at the same time forming a bearing surface for outer lens 6. On its side pointing toward the outside, it is provided with a convex curvature 10 and, on its side pointing toward the interior of front housing shell 3, it is provided with a concave curvature 11. Outer lens 6 is resting on an annular spacer 12, which is inserted in objective lens mount 4.

A contact surface 13 is formed on one side of annular spacer 12, on which outer lens 6 is resting via its concave curvature 11, and there is a flexible zone 14 on the other side. Via flexible zone 14, annular spacer 12 is braced on a second lens 15 of lens stack 5. In the representation according to FIG. 1, second lens 15 has likewise been provided with a convexly shaped curvature on its side pointing in the direction of outer lens 6, whereas the side of second lens 15 facing the housing interior of front housing shell 3 has a concave shape. A third lens 19 is disposed underneath second lens 15. Third lens 19 has a planar surface 20 and is resting against wall areas 18 of a screw-in element 17 that may be inserted in objective lens mount 4. Second lens 15 is braced on planar surface 20 of third lens 19 and on a contact surface 16 having an annular configuration.

Third lens 19 of lens stack 5 has a concave curvature 21 in addition to planar surface 20. Concave curvature 21 of third lens 19 is delimited by an annular surface. At this annular surface, third lens 19 is sitting on a diaphragm ring 22. Diaphragm ring 22 in turn is braced on a bearing ring 23 of screw-in element 17. Diaphragm ring 22 fixes a fourth lens 24 of lens stack 5 in place inside screw-in element 17. Fourth lens 24, which may have a first convex curvature 25 and a second convex curvature 26, for instance, is gripped from below by a bearing edge 27 formed on the underside of screw-in element 17, and retained in screw-in element 17.

In the representation according to FIG. 1, second lens 15, third lens 19 and fourth lens 24 are guided through screw-in element 17 and lined up next to each other, screw-in element 17 including an external thread 30, which cooperates with an internal thread 28 formed on the inner wall of objective lens mount 4. Screw connection 29, which is formed when screw-in element 17 is screwed into internal thread 28 of objective lens mount 4, fixes lens stack 5 in place inside the objective lens mount.

The front housing shell, illustrated in FIG. 1, of housing 2 of a camera able to be used in motor vehicles may be made of a metal material. Die-cast aluminum, for instance, or thixo-mold are suitable as metal materials. Front housing shell 3 illustrated in FIG. 1 may also be produced by deep-drawing. When a metal material is used, front housing shell 3 is impervious to the ingress of water vapor.

As an alternative, front housing shell 3, to which a connection point 32 for a rear housing shell (not shown) of the camera able to be used in motor vehicles may be connected, can also be produced from plastic reinforced with glass fiber. If such a material is chosen, its imperviousness to water vapor may be achieved by a metal film deposited with the aid of plasma coating technology. Front housing shells 3 of housing 2 of the camera able to be used in motor vehicles may be produced by way of the shared component method. If a metal material is used, post-machining of objective lens mount 4 may be carried out by chip-forming machining methods such as post-lathing, in order to adapt the length of objective lens mount 4 to the height of lens stack 5, i.e., the number of individual lenses included therein. As a result, a base element of a front housing shell 3 is able to be used for a plurality of camera variants of cameras for automotive applications. Furthermore, in a post-machining, objective lens mount 4 in front housing shell 3 is able to be precisely aligned with respect to affixation devices disposed on the outside of front housing shell 3.

The fitting of objective lens mount 4 of front housing shell 3 of housing 2 with individual lenses 6, 15, 19 and 24 may also be done by a vendor, if appropriate. Lenses 6, 15, 19 and 24 are able to be inserted in objective lens mount 4 both via inside 34 of objective lens mount 4. Assembling individual lenses 6, 15, 19 and 24 both via outside 33 and via inside 34 is possible as well. If front housing shell 3 is fitted via housing cavity 31, then sealing ring 7 is advantageously inserted in recesses 8 which are enclosed by grasping edges 9, this being implemented prior to inserting outer lens 6 of lens stack 5 in objective lens mount 4. As illustrated in FIG. 1, sealing ring 7 may be designed in the form of an O-ring; still other cross-sectional forms of sealing rings 7 may be considered in addition. Grasping edges 9 simultaneously serve as stop for convex curvature 10 of outer lens 6 of lens stack 5.

Due to the design approach provided by the present invention, it is advantageously possible to dispense with an objective lens mount that has to be installed separately and fixed in place inside of front housing shell 3. In this way, the tolerance chain in the assembly of cameras suitable for use in motor vehicles is able to be reduced further. In addition, the approach provided according to the present invention allows an uncomplicated sealing of housing cavity 31 of the camera.

For the sake of completeness, it should be mentioned that the rear housing shell of housing 2 (not shown in FIG. 1) may be joined to front housing shell 3 shown in FIG. 1, at connection point 32. Connection point 32 may be designed as a groove/spring system, for instance, which effectively prevents the ingress of water vapor, moisture or dirt particles into housing cavity 31 of the camera suitable for use in motor vehicles. To protect against penetrating moisture and also as EMV protection, inside 34 of housing 2 may be coated with the aid of plasma coating, for instance by a metal film.

What is claimed is:

1. A method for producing an objective lens mount for an objective lens of a camera configured for use in a motor vehicle, comprising:
 a) producing the objective lens mount and a front housing shell of a housing of the camera as a single component in a single production process, wherein the objective lens mount and the front housing shell are made of one of a) a metal material and b) a plastic material having a glass fiber component; and
 b) adapting the objective lens mount built in one piece with the front housing shell is adapted by chip-forming machining of the length of the objective lens;
 wherein the objective lens mount is fitted with multiple individual lenses of a lens stack, and wherein the individual lenses are fixed in place with the aid of a screw-in element fitted to the interior of the objective lens mount, and wherein at least one the individual lenses is located inside the screw-in element.

2. The method as recited in claim 1, wherein in step a), the single component including the objective lens mount and the front housing shell is produced from one of die-cast aluminum and thixomold.

3. The method as recited in claim 1, wherein in step a), the single component including the objective lens mount and the front housing shell is provided with a metal film on one of the outside of the housing and the inside of the housing by plasma coating.

4. The method as recited in claim 1, wherein in step b), the objective lens mount is aligned with respect to an affixation point on the outside of the front housing shell.

5. The method as recited in claim 1, wherein the individual lenses are fitted into the objective lens mount via the inside of the housing, and wherein a sealing element is inserted in recesses of the objective lens mount.

6. The method as recited in claim 1, wherein, during the fitting of the plurality of individual lenses into the objective lens mount, a second lens of the lens stack is placed next to an annular spacer, and wherein the annular spacer is braced on a first lens of the lens stack, the first lens being the outermost lens of the lens stack.

7. The method as recited in claim 1, wherein the outermost lens of the lens stack and an innermost lens of the lens stack lying in the housing interior are fixed in place by stops of the objective lens mount.

8. The method as recited in claim 1, wherein the outermost lens of the lens stack and an innermost lens of the lens stack lying in the housing interior are fixed in place by bearing edges of the screw-in element.

9. A camera configured for use in a motor vehicle, comprising:
 an objective lens mount for accommodating an objective lens; and
 a housing shell of the camera;
 wherein the objective lens mount and the housing shell of the camera are configured as a unitary single component made of one of a) a metal material and b) a plastic material having a glass fiber component, and wherein the objective lens mount integrally formed with the housing shell is adapted to the length of the objective lens;
 wherein the objective lens mount is fitted with multiple individual lenses of a lens stack, and wherein the individual lenses are fixed in place with the aid of a screw-in element fitted to the interior of the objective lens mount, and wherein at least one the individual lenses is located inside the screw-in element.

10. The camera as recited in claim 9, wherein the objective lens is formed by a lens stack system including a first lens which is an outer lens, a second lens, a third lens, and a fourth lens.

11. The camera as recited in claim 10, wherein the second lens, the third lens, and the fourth lens are accommodated in the screw-in element.

12. The camera as recited in claim 10, wherein the outer lens is urged against a grasping edge of the objective lens mount by an annular spacer, and wherein the annular spacer has a flexible zone and is braced on the second lens.

13. The camera as recited in claim 9, wherein the inside of the housing shell is coated by a metal film.

* * * * *